United States Patent
Laethem et al.

(10) Patent No.: US 10,503,727 B2
(45) Date of Patent: Dec. 10, 2019

(54) SYSTEM AND METHOD FOR MAPPING DATABASE CHANGES

(71) Applicant: ServiceNow, Inc., Santa Clara, CA (US)

(72) Inventors: Jared Laethem, Carlsbad, CA (US); Anson Barber Mayers, San Rafael, CA (US)

(73) Assignee: ServiceNow, Inc., Santa Clara, CA (US)

( * ) Notice: Subject to any disclaimer, the term of this patent is extended or adjusted under 35 U.S.C. 154(b) by 257 days.

(21) Appl. No.: 15/487,224

(22) Filed: Apr. 13, 2017

(65) Prior Publication Data

US 2017/0308568 A1    Oct. 26, 2017

Related U.S. Application Data

(60) Provisional application No. 62/327,561, filed on Apr. 26, 2016.

(51) Int. Cl.
*G06F 16/00* (2019.01)
*G06F 16/23* (2019.01)
(Continued)

(52) U.S. Cl.
CPC ............ *G06F 16/2379* (2019.01); *G06F 8/65* (2013.01); *G06F 9/44505* (2013.01); *G06F 16/1873* (2019.01); *G06F 16/2365* (2019.01)

(58) Field of Classification Search
CPC ...... G06F 16/283; G06F 16/2365; G06F 8/65; G06F 9/44505; G06F 16/1873
(Continued)

(56) References Cited

U.S. PATENT DOCUMENTS 6,366,930 B1 * 4/2002 Parker ............... G06F 21/565
707/999.203
6,886,018 B1 * 4/2005 Boudris ............. G06F 16/258
707/625
(Continued)

OTHER PUBLICATIONS joinfu.com, "Managing Many to Many Relationships in MySQL—Part 1", Dec. 8, 2005, http://www.joinfu.com/2005/12/managing-many-to-many-relationships-in-mysql-part-1/, Downloaded Feb. 17, 2017, 21 pp.
(Continued)

*Primary Examiner* — Vincent F Boccio
(74) *Attorney, Agent, or Firm* — Fletcher Yoder PC

(57) ABSTRACT

Software updates that cause changes to a database accessible by software can be identified. A first database can be modified using first instructions associated with a first software update to generate a first modified database, and a second database can be modified using second instructions associated with a second software update to generate a second modified database. A difference between the first and second modified databases can be determined, and one or more instructions of the first or second instructions that caused the difference can be identified based on the difference. The first and second instructions can be converted into operations that, when performed against the first and second databases, result in first and second many-to-many tables being generated. The many-to-many tables can be queried to identify the operations associated with the difference between the first and second modified databases.

20 Claims, 6 Drawing Sheets

(51) Int. Cl.
*G06F 8/65* (2018.01)
*G06F 16/18* (2019.01)
*G06F 9/445* (2018.01)

(58) Field of Classification Search
USPC .......................................................... 707/690
See application file for complete search history.

(56) References Cited

U.S. PATENT DOCUMENTS

| | | | |
|---|---|---|---|
| 7,509,325 B2 * | 3/2009 | Martin, Jr. ............ | G06F 16/214 |
| | | | 707/999.104 |
| 7,512,631 B2 | 3/2009 | Medicke et al. | |
| 8,589,426 B1 * | 11/2013 | Miles ...................... | G06F 16/33 |
| | | | 707/758 |
| 9,053,137 B2 | 6/2015 | Medicke et al. | |
| 9,075,633 B2 * | 7/2015 | Nos ..................... | G06F 16/1873 |
| 2014/0108440 A1 * | 4/2014 | Nos ..................... | G06F 16/1873 |
| | | | 707/758 |

OTHER PUBLICATIONS

Microsoft, MSDN, "How to: Use Schema Compare to Compare Different Database Definitions", Date Unknown, https://msdn.microsoft.com/en-us/library/hh272690(v=vs.103).aspx, Downloaded Feb. 17, 2017, 4 pp.
BEA, oracle.com, "Using the Database Loader", Updated Nov. 9, 2001, BEA WebLogic Portal 4.0, https://docs.oracle.com/cd/E13218_01/wlp/docs40/catalog/dbloader.htm, Downloaded Feb. 17, 2017, 7 pp.

* cited by examiner

SYSTEM AND METHOD FOR MAPPING DATABASE CHANGES

CROSS-REFERENCE TO RELATED APPLICATION(S)

This application claims the benefit of U.S. Provisional Application No. 62/327,561, filed Apr. 26, 2016, the disclosure of which is hereby incorporated by reference in its entirety.

TECHNICAL FIELD

This disclosure relates in general to mapping database changes.

BACKGROUND

An electronic computing and communications system can include one or more communicating and computing elements, which can, in the course of communicating and computing, process information using servers operating at a datacenter. For example, a Platform-as-a-Service (PaaS) provider can operate platform software accessible by its customers. The platform software can access a database that stores data used to operate the platform software. A PaaS provider can provide updates to the platform software that, when processed, include modifying the database accessible by the platform software.

SUMMARY

Disclosed herein are implementations of systems and techniques for mapping database changes.

In an implementation, a method is provided for identifying updates to software that cause changes to databases accessible by the software. The method comprises modifying a first database using first instructions associated with a first software update to generate a first modified database, and modifying a second database using second instructions associated with a second software update to generate a second modified database. The method further comprises determining a difference between the first modified database and the second modified database. The method further comprises identifying, based on the difference, one or more instructions of the first instructions or the second instructions that caused the difference.

In an implementation, a system is provided for identifying updates to software that cause changes to databases accessible by the software. The system comprises a memory configured to store one or more processor-executable routines. The system further comprises a processor configured to communicate with the memory and to execute the routines stored therein. The routines, when executed, cause the system to modify a first database using first instructions associated with a first software update to generate a first modified database, and to modify a second database using second instructions associated with a second software update to generate a second modified database. The routines, when executed, further cause the system to determine a difference between the first modified database and the second modified database. The routines, when executed, further cause the system to identify, based on the difference, one or more instructions of the first instructions or the second instructions that caused the difference.

In an implementation, a method is provided. The method comprises generating a second database from a first database based on operations associated with one or more software updates. The method further comprises determining that at least some of the operations are associated with differences between the first database and the second database.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
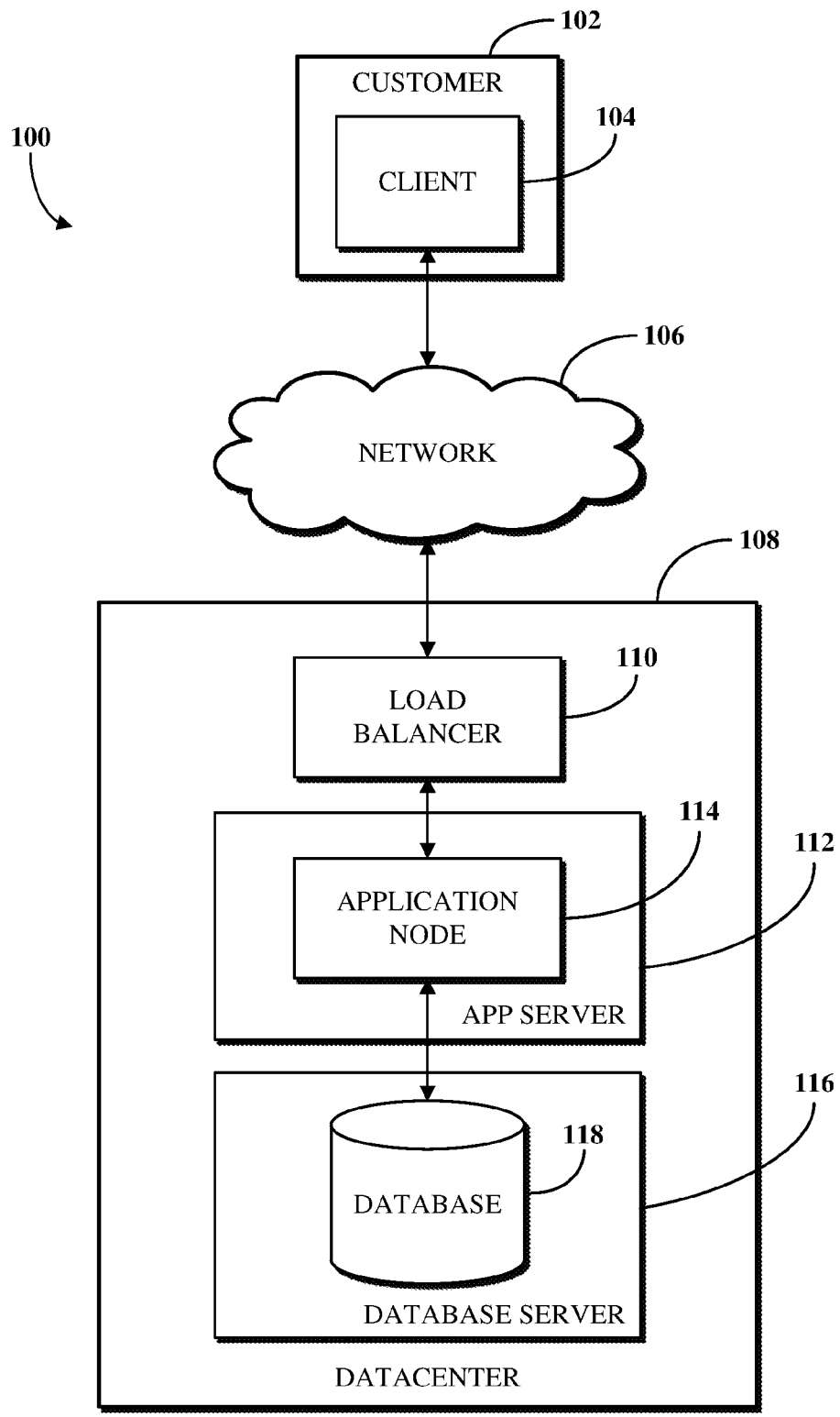
FIG. 1 is a block diagram of an example of an electronic computing and communications system.

Generally, upgrades to platform software can include changing databases used by or for the platform. For example, application files installed during an upgrade can include scripts, database statements, or other functionality for modifying the schema of or data stored in a database. An upgrade can include changing a database in the context of a software upgrade to, for example, a newer software and database version; however, an upgrade can also or instead include other changes to databases and/or software, including changes that may be characterized as a downgrade, patch, plugin installation, plugin uninstallation, or a combination thereof. The terms "upgrade" and "update" are used interchangeably throughout this disclosure to refer to changes made to databases and/or software.

An upgrade to platform software can be time-consuming. Steps can be taken to optimize the efficiency of the upgrade, such as by reordering, combining or changing the steps used to update the database. For example, instead of writing updates multiple times to a table over the course of an upgrade, updates can be batched in memory and then updated to the table at once (or in a fewer number of updates). An upgrade package can be created without performance optimizations and another with performance optimizations. Although the performance optimizations may be implemented with the goal of improving the performance or efficiency of the upgrade while not affecting the changes being made to the database, it is possible that certain performance optimizations may have unintended effects on the database.

There are many contexts in which this type of upgrading can occur. In a first example, a PaaS provider may make changes to the platform, for example, by upgrading the platform software to a new version in order to offer its customers new functionality or improved performance. Databases for storing data used by the platform software may thus be changed in the upgrade process, for example, based on the addition or deletion of data, changes in database schema, etc. In another example, a developer of application software installable on platform software may create, modify, or configure various scripts, database queries, and other operations in or for the application. Over time, the developer may add new functionality to the application software, remove existing functionality, or modify how the application software is processed or communicates with system resources. To that end, modifications made to application software may include making changes to source code relating to the application (e.g., by adding, removing, or modifying scripts), which may affect the data stored in and/or behavior of a database used by the application software. In yet another example, the developer may change the database schema or contents through, for example, an interface provided by the platform software.

Different versions of a database can be created by modifying the database based on different changes to the application software. For example, the instructions to update application software to a first version may be different from the instructions to update the application software to a second version. When processed, those instructions can cause two different versions of an updated database to be created.

In some cases, it may be desirable to compare the data schema, content, or behavior of two versions of a database. For example, a PaaS provider may optimize an upgrade to the database and it may be desirable to determine whether and how differences were introduced because of the optimization. In another example, a developer of application software, upon updating the application software, may desire to compare the data contents and/or behavior of two versions of the database to determine whether the implemented change resulted in different data being stored or affected the behavior of the database. A database loader can be used to install changes to a database. A database loader can include application files that direct or configure the database loader to make changes to the database in a particular order. For example, database loaders with different application files and/or ordering can be used to prepare two versions of a database for comparison.

However, where differences are identified between database versions (or databases, for short), it is useful for a user, such as an administrator of a PaaS provider, an administrator of a customer of a PaaS provider, or another application software developer to understand the operations that caused the differences. Conventional database comparison tools may be able to indicate which records within a database have been modified, but they are not capable of mapping the records that have changed with a source of the change, such as an application file (e.g., comprising SQL scripts capable of modifying a database). Where a difference between databases indicates a decrease in the database's performance or causes the database to not operate as intended (e.g., because data required to be stored has been corrupted or modified queries do not properly load data for use with the corresponding application), the ability to trace the difference to the source can be of great benefit to a vendor or developer.

Implementations of this disclosure may address problems such as those described above by determining differences between databases modified in connection with different software updates and identifying instructions (e.g., application files) of the respective software updates that caused those differences. A first database can be modified using first instructions associated with a first software update to generate a first modified database. A second database can be modified using second instructions associated with a second software update to generate a second modified database. The first and second modified databases can be compared to determine differences between the data thereof or structural elements defining how the data is stored therein. A data structure, including but not limited to a many-to-many table (MTMT), can be generated based on each software update, wherein each MTMT can associate specific data or structural elements with instructions of the respective software update that caused changes to those data or structural elements. The differences determined between the first and second modified databases can thus be referenced against entries of MTMTs generated for the first and second software updates to identify the instructions thereof that caused those differences.

Implementations of this disclosure provide technological improvements particular to computer networks, for example, those concerning the updating of platform software or other software that accesses databases within electronic computing and communications systems. Computer network-specific technological problems, such as the identification of instructions associated with different software updates that cause different changes to be made to a database, can be wholly or partially solved by implementations of this disclosure. For example, an MTMT generated in connection with a software update can indicate which aspects of a database were changed by specific instructions associated with the software update. The implementations of this disclosure introduce new and efficient improvements in the ways in which a PaaS provider (or other developer or tester of software) identifies update instructions to change before providing a software update to an end-user, such as by associating data stored in MTMTs with changes to a database caused by different update instructions.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database 118, which can be accessible by software executed on the application node 114. The database 118 may be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, the servers associated with the system 100 can include instructions for modifying databases based on instructions associated with software updates, determining differences between modified databases, and identifying the software update instructions that caused those differences. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
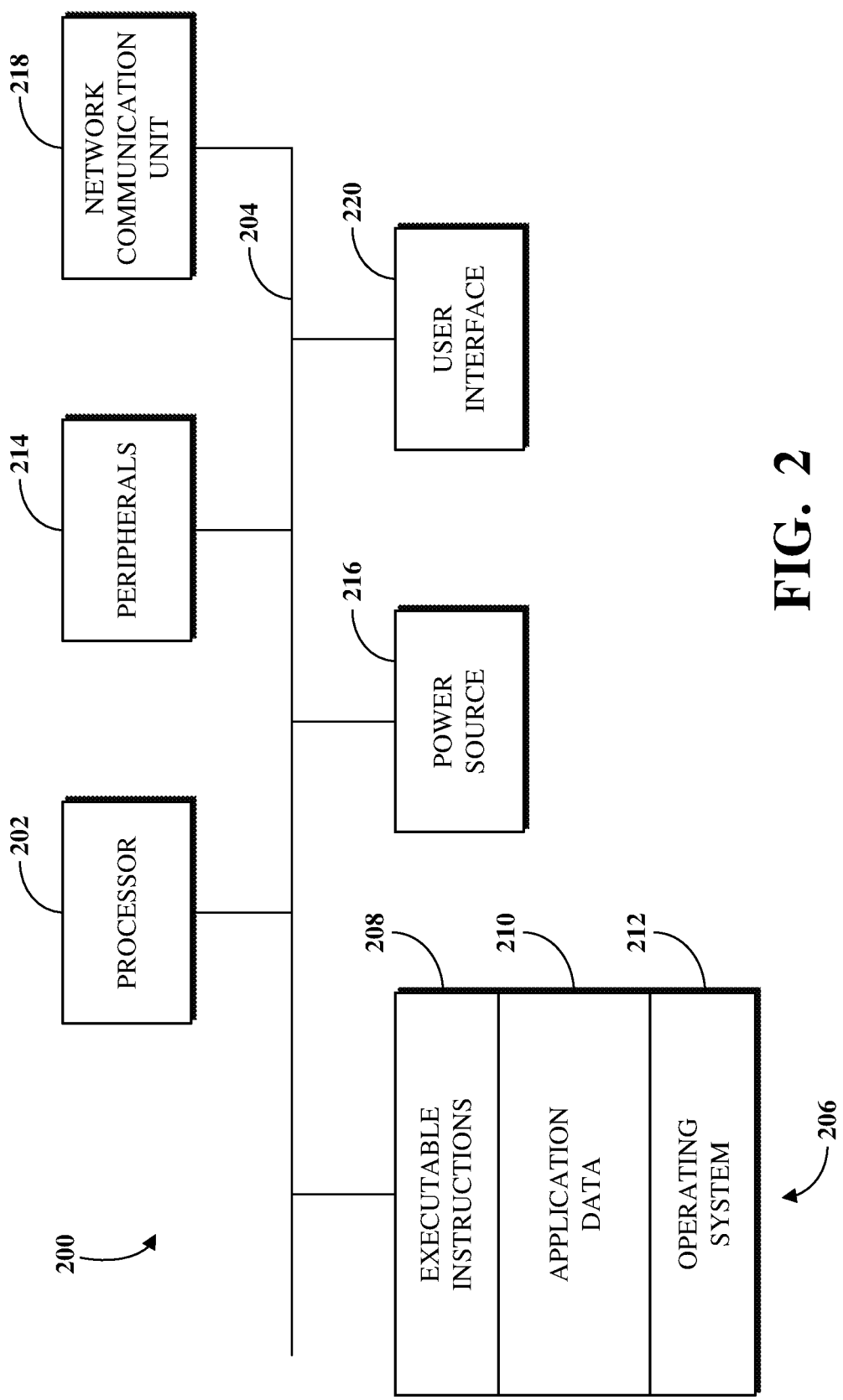
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to modify databases based on instructions associated with software updates, determine differences between the modified databases, and identify the software update instructions that caused those differences.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
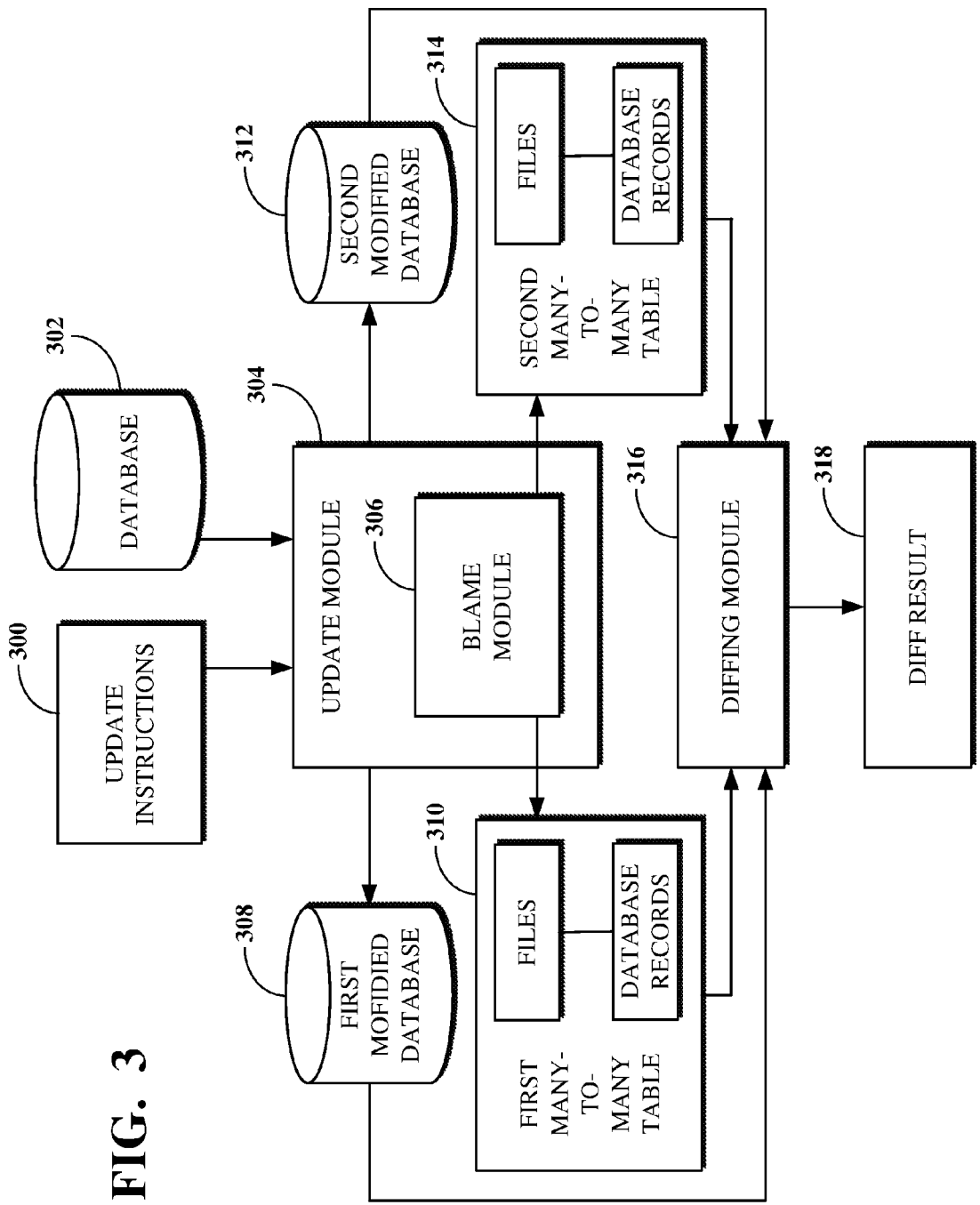
FIG. 3 is a block diagram of an example of a system for mapping database changes based on software updates.

FIG. 3 is a block diagram of an example of a system for mapping database changes based on software updates. The database changes can be mapped using one or more computing devices, for example, server devices operating at a datacenter, such as the datacenter 108 shown in FIG. 1. For example, the server devices can include application nodes, such as the application node 114 shown in FIG. 1, executing software that accesses a database, such as the database 118 shown in FIG. 1. The software can be platform software operated by a PaaS service provider. The PaaS service provider can execute distinct instances of the platform software for its respective customers, such that a customer can access its instance of the platform software by communicating with a server device executing the instance. The instance of platform software may execute on an application server, such as the application server 112 shown in FIG. 1, which can implement an environment for the platform software (e.g., a Java Virtual Machine) on an application node, such as the application node 114 shown in FIG. 1. In some implementations, the application server can implement multiple application nodes to execute the instance of platform software.

The system for mapping database changes based on software updates includes a database 302, an update module 304, and a diffing module 306. The update module 304 can be configured to upgrade databases using instructions for performing software upgrades. In FIG. 3, update module 304 takes as input a database 302 and update instructions 300 (e.g., a set of application files, a set of SQL scripts, database statements, Java classes, JavaScript scripts, etc.) and translates a request for upgrading the database 302 from the update instructions 300 (e.g., to include certain data within the upgraded version of the database) into operations to be processed in fulfilling the request (e.g., touch table X, run query Y, etc.). For example, the update instructions 300 can include requests to add a column to an existing table of the database 302, perform schema and data change operations on the database 302, etc., as part of an upgrade process. The fulfilment of requests from the update instructions 300 can include making calls to the database 302 via database statements, which database statements can be or include transformational operations (e.g., insert, update, delete, etc.) or other operations for modifying database schema or data contained within the schema (e.g., to create a table, alter a table, drop a table, create an index, etc.). The update instructions 300 can also or instead include requests for making multiple calls to the database 302 to fulfil the requests. The update instructions 300 can also or instead include scripts (e.g., server-side JavaScript) for performing operations on the database 302 based on the data included within the database 302 or conditions detected by the scripts, for example, to preserve data integrity or stability.

After processing the update instructions 300, the update module 304 can generate, or cause to be generated, a modified database comprising the schema and data of the database 302 as modified using the update instructions 300. In some implementations, update instructions associated with a first software update can be processed to generate a first modified database 308 and update instructions associated with a second software update can be processed to generate a second modified database 312, wherein the upgrade instructions of the first and second software updates can comprise different requests for upgrading the database 302.

The update module 304 includes a blame module 306 for recording schema and data change operations performed on databases as part of fulfilling upgrade requests (e.g., of the update instructions 300) processed by the update module 304. The blame module 306 can record, or log, data as operations comprising an upgrade request are performed against a database being upgraded. For example, the blame module 306 can generate log data indicative of a request performed with respect to the database 302 (e.g., by deleting records related to a particular page of a web-based application). The blame module 306 can also or instead record, or log, the operations (e.g., touch table X, run query Y, etc.) run against the application files being processed during an upgrade by the update module 304. Using this information, the blame module 306 can generate an MTMT (e.g., a first MTMT 310 and a second MTMT 314) for mapping database records for a database upgraded by the update module 304 (e.g., the first modified database 308 and the second modified database 312) to the application file sources (e.g., SQL scripts, etc.) included in the update instructions 300 that touched them. An MTMT can thus be used to indicate how and/or why a database record was touched or changed by a modification during an upgrade process. The blame module 306 (and the MTMTs 310, 314) can thus be used to indicate a source of a database modification resulting in a difference between the database 302 and an upgraded database (e.g., one of first modified database 308 and the second modified database 312). The blame module 306 can generate an MTMT in response to changes being made to a corresponding database.

An MTMT, such as the first and second MTMTs 310, 314, contains a chronological record of the operations that occurred during the upgrade process by the update module 304, for example, to generate (or cause to be generated) a corresponding upgraded database, such as the first and second modified databases 308, 312. For example, an MTMT can include a counter, which can indicate a number N representing that the corresponding operation was the Nth operation performed in the upgrade process, a number of times a database record was manipulated during the upgrade process by an operation, a timestamp indicating a date and time at which each operation was performed during the upgrade process, etc. The chronological record of MTMTs generated from different upgrade processes (e.g., the first and second MTMTs 310, 314) can be compared to indicate how the corresponding databases (e.g., the first and second modified databases 308, 312) differ based on the ordering of the operations processed to generate them.

The first MTMT 310 or the second MTMT 314 can be viewed within a graphical display region (e.g., after it is generated by the blame module 306 and before it is processed by a diffing module 316, discussed below) for a user device. The graphical display region can comprise part of a software graphical user interface constituting data that reflect information ultimately destined for display on a hardware device. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

An MTMT can be sorted, filtered, etc. by a user or other operator in viewing the data within the graphical display region. The graphical display region for an MTMT can include a link, for example, within a column for each row of the MTMT, for directing a user to a form including the database record that was touched as a result of an operation corresponding to the row. The link can be generated, for example, by looking at the row of the MTMT corresponding to the identifier of the record, identifying within a field in the row the name of the table storing the record, and concatenating the table name and record identifier. The concatenation order can be based on the user's language. For example, the table name may come first for a user using an English version of the software, or it may come last for a user using a Chinese version.

The diffing module 316 can compare the first and second modified databases 308, 312 (e.g., generated or caused to be generated by the update module 304) and the corresponding first and second MTMTs 310, 314 (e.g., generated by the blame module 306) to determine differences between first and second modified databases 308, 312 resulting from their respective upgrade processes. For example, the diffing module 316 can be used to compare a previous version and a new version of the same database (e.g., where the new version includes data of the previous version modified based on upgrade instructions processed by the update module 304, such as the database 302 and one of the first or second modified databases 308, 312) and the corresponding MTMT to determine how a request changed the database records. As another example, the diffing module 316 can compare two upgraded versions of a database (e.g., the first and second modified databases 308, 312) and their corresponding MTMTs to determine how requests to change the database records resulted in differences between the databases, which can, for example, be useful for comparing performance, system resource usage, or other operational efficiency between the databases. This is because upgrade instructions used for a first upgrade process can be different from those of a second upgrade process. For example, the instructions can indicate different data fields to be touched during the upgrade processes.

The instructions can also indicate that the same data fields of the source database are to be touched in each upgrade process, but that they will each change in a different way. In that way, the diffing module 316 can use the first and second modified databases 308, 312 and the first and second MTMTs 310, 314 to determine how two upgrade processes differed. The calculation or other determining of differences between two versions of a database (e.g., the database 302 and the first modified database 308, the database 302 and the second modified database 312, the first modified database 308 and the second modified database 312, etc.) can include using data indicative of the database schema, the data stored within the schema, and/or data recorded or generated by the blame module 306. The diffing module 316 can compare more than two databases and their corresponding MTMTs.

The diffing module 316 can take as input an MTMT and the corresponding upgraded database (e.g., the first MTMT 310 and the first modified database 308). For example, a database having a table with two rows and two columns can be processed by a first upgrade, which changes the data stored in one of the four fields. The MTMT resulting from the first upgrade process can have one row indicating that a file was processed against (e.g., touched) the one database field that was changed. A second upgrade process run against the initial database may not change any of the stored data. The MTMT resulting from the second upgrade process would thus not include the row of the MTMT resulting from the first upgrade process. The diffing module 316 can determine that the reason that the databases resulting from the two upgraded processes have a different data value stored in the one field is because the resulting MTMT tables are different. Based on data derived from the MTMTs 310, 314, such as differences in data and application files that caused the differences, the diffing module 316 can determine whether a set of application files, scripts, or database statements (e.g., the number or versions of files, scripts, or database statements included in the sets) changed between two different upgrade processes.

The diffing module 316 can determine whether two databases are identical, for example, by comparing the data stored in corresponding data fields within them. In the event the diffing module 316 indicates that there are differences in the compared databases (e.g., because the stored data has changed as a result of the different update instructions used to upgrade them from the database 302), the diffing module 316 can reference the MTMTs corresponding to the compared databases to determine what caused the differences. The diffing module 316 can measure functional equivalence between databases it receives as input, for example, to determine whether the databases operate (e.g., function, or behave) in the same way despite having differences in data values. For example, the identifiers from the schema of the first and second compared databases can be analyzed by a functional equivalence engine (e.g., included as part of the diffing module 316) to determine that the data represented by the identifiers behave the same. Because the diffing module 316 can be aware of functional equivalence, the processing by the diffing module 316 can indicate both raw data differences and functional equivalence differences resulting from two different upgrade processes.

A functional equivalence engine can operate based on identities defined for different types of database records. For a record with no other identifier, the identity of the record can be the unique identifier associated with the record. For a record in a table having a unique constraint, the identity of the record can be a combination of attributes referenced in that constraint. For example, a localization of a string into a language might have the source string and the target language as its unique constraint. Two localization records having the same combination of source string and target language, but which are associated with different unique identifiers and stored in different databases, can be considered functionally equivalent. In an implementation, the database comparisons performed by the diffing module 316, whether for counts, row-level differences, column-level differences, etc., can be based on a functional equivalence definition, for example, for using corresponding record identities.

In the event that both databases operate identically or substantially similarly in response to the set of queries (e.g., where a threshold value is used for gauging a maximum allowed degree of difference), functional equivalence can be determined. As an example, the first modified database 308 may have a foreign key included within a data field of a first table, which foreign key points to a primary key data value within a second table. The second modified database 312, which may or may not share the schema of the database 302, may have a different foreign key within the same data field of the first table that points to a different primary key data value. Where the respective foreign keys of the first and second modified databases 308, 312 differ, for example, because the records to which each points are distinct, the diffing module 316 can determine functional equivalence where the records being pointed to serve the same functional role.

The functional equivalence engine can determine functional equivalence for an original record by traversing relationships where a reference is made to another record on which functional equivalence can be determined. For example, a table can have multiple forms associated with it, wherein one form can be associated for each view on the table, and wherein each form can have a functional equivalence definition. Further, although a form for a table and view may not include attributes, it may include references to them. For example, as stored in a database, the unique identifier for table A may be 12345 and the unique identifier for view B may be 23456. The form for table A, view B, which has the unique identifier 34567, may only store 12345 and 23456 as its table and view attributes, respectively. However, in a different database, the form may have the unique identifier 45678 and store the unique identifiers for table A and view B as 56789 and 67890, respectively. The diffing module 316 can use the functional equivalence engine to identify form 34567 as being functionally equivalent to form 45678.

After comparing the first and second modified databases 308, 312 and the corresponding first and second MTMTs 310, 314, the diffing module 316 can generate a diff result 318, which can comprise mapping data for indicating differences between compared databases, as determined by the diffing module 316. Differences between database data recorded in the diff result 318 can be observed at various levels. For example, two databases can be compared by the diffing module 316 to determine if the schemas contain tables having the same column data types, if the data types have the same attributes, if the attributes are part of the same indexes, etc. The structure of each database involved in the comparison can be observed to determine differences. For example, the diffing module 316 can record to the diff result 318 for indicating that two databases having the same schema have different attribute values in Column X, Row Y. The source of the change for that data field can be identified to determine the cause of the difference.

In some implementations, certain difference data can be excluded from the diff result 318. For example, because each upgrade process can be performed and resulting database created at different times, identified differences between timestamps indicating the dates and times at which various upgrade operations were performed can be excluded from the relational database tables. This type of difference data may not be useful to a user since it is does not have any bearing on the use or performance of the compared databases.

In an implementation, the diff result 318 can include data derived from the diffing module 316 for determining the differences between first and second upgraded processes used to generate first and second modified databases 308, 312 (and the first and second MTMTs 310, 314). The diff result 318 comprises relational database tables related to the comparison between databases and MTMTs by the diffing module 316. For example, a row-level difference table can contain rows that enumerate the rows that are only in a first compared database, only in a second compared database, or in both the first and second compared databases. A column-level difference table can have data derived, for example, from the columns of the rows that are different between the first and second compared databases on a column-by-column basis. A row can be created in the column-level difference table for each column-level difference. An ignored table can indicate the database tables that were ignored by the diffing module 316, for example, because of volatility or irrelevance to the database comparison (e.g., log or other transactional tables). The ignored table can be configured for a user to define bounds of volatility or irrelevance. A counts table can include columns with counts for indicating the number of identical or different values between the tables of the first and second compared databases.

To enable troubleshooting of database upgrade processes using the diff result 318, a check sum table can be used to compare the multiple representations of counts indicated by the diff result 318. A first set of check sum rows can include counts of the data from the counts difference table for each table in the compared databases. A second set of check sum rows can include counts of the data from the row-level difference table for each table in the compared databases. A third set of check sum rows can include counts of the data from the column-level difference table for each table in the compared databases. The various rows can be inserted into the check sum table, and a query can then be run on the check-sums table to determine whether the total count of records for each table in the compared databases in the counts, row-level difference, and column-level difference tables is consistent with the results in the other tables. In the event that they are inconsistent, it can be determined that an error arose during either the upgrade or comparison process (e.g., within the update module 304 or the diffing module 316). One or more of the foregoing tables can be included in the relational database tables of the diff result 318. Other tables not discussed above can be included within the diff result 318 in addition to or in place of the tables discussed above.

The location and/or type of differences indicated in the diff result 318 can drive the user to different troubleshooting outcomes for optimizing a database upgrade process. For example, a user can review the diff result 318 generated based on the diffing module 316 processing the first modified database 308 and the second modified database 312, the database 302 and first modified database 308, or database 302 and the second modified database 312. The particular use cases for utilizing the diff result 318 can differ based on the context of the underlying upgrade. For example, where the update instructions 300 include a script written to touch various database records, the diff result 318 can validate the database records that were or were not touched by the script. As another example, where the update instructions 300 include a performance improvement not intended to manipulate any data in the database, the diff result 318 can indicate unexpected differences between the set of database records that were touched and their final states.

A user reviewing the diff result 318 can use database statements, including but not limited to SQL queries, and other relational database analysis tools to manipulate the data stored in the diff result 318 to determine the differences in the upgrade processes. For example, a user can write a database statement to join two tables of the diff result 318 to compare the counts included in each. This can be useful to understand how different upgrade processes affect source database data, for example, by indicating the counts for updates each process makes to data in the database tables. Another query can, on a table-by-table basis, indicate differences between sets of columns that were touched during the upgrade processes. In an implementation, an auto-remediation or other intelligent action can be taken with respect to the diff result 318 to discern the differences between first and second upgrade processes. For example, an automatic processing could occur using machine learning or other algorithms. As such, in an implementation the diff result 318 can be a module comprising instructions for a system to analyze the comparison data, for example, to assist a user in optimizing how platform or application databases are being upgraded.

The diff result 318 can thus be used, for example, by PaaS providers, customers of PaaS providers, or other application software developers prior to releasing an upgrade or by developers during development or deployment of an application, for example, for optimizing the performance of corresponding databases by validating that modifications, which resulted in an upgraded database that improved performance as compared to a previous version of the upgrade engine or application (e.g., prior to the subject modifications being made), did not alter the structure of the upgraded database or the data it contains. Thus, differences indicated using the diffing module 316 can be used to debug a database, for example, by identifying issues caused by modifications made to the database or otherwise understanding how the behavior of the database changed as a result of the modifications.

Figure 4:
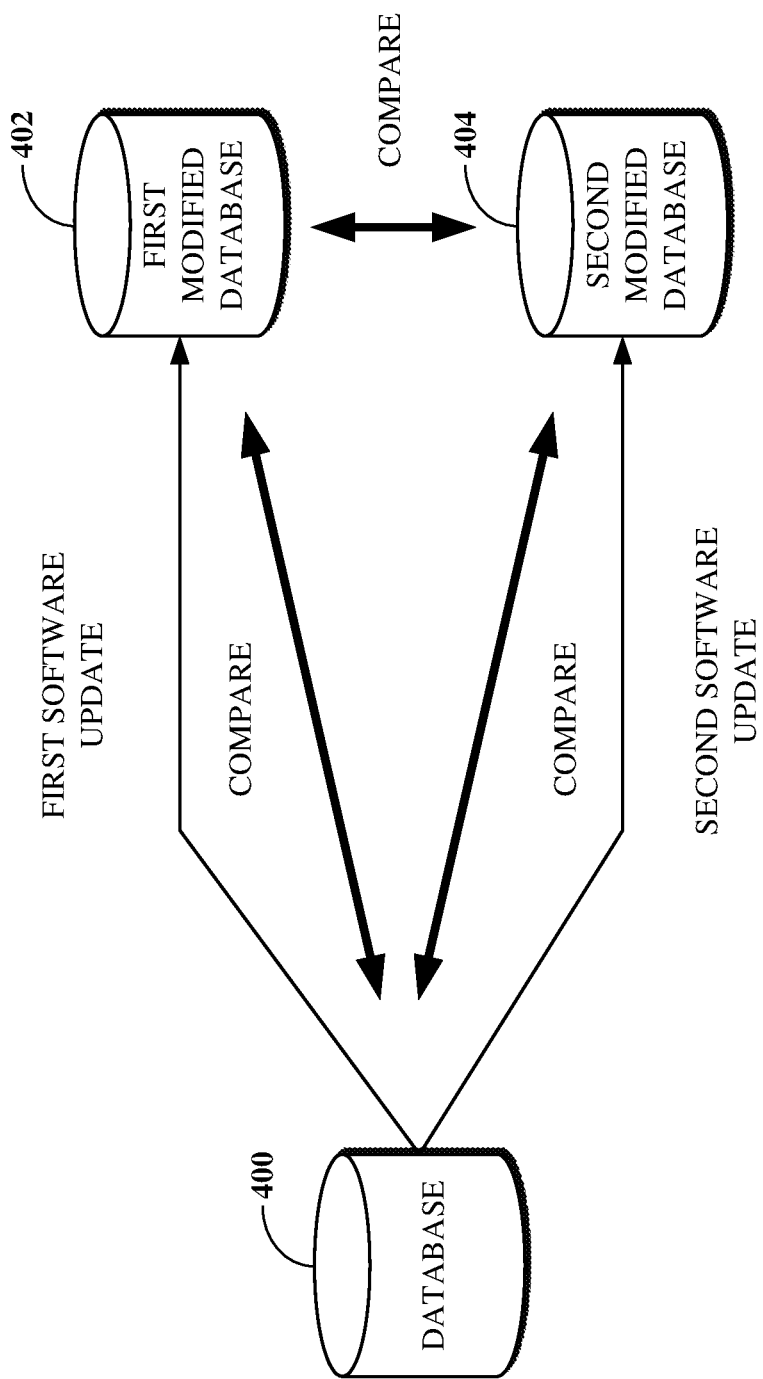
FIG. 4 is a diagram of an example of a comparison between databases updated based on software updates.

FIG. 4 is a diagram of an example of a comparison between databases updated based on software updates. In some contexts, an initial version (e.g., a pre-update version) of a database 400 (which may be the database 302 shown in FIG. 3) can be compared to a modified version generated responsive to or otherwise in connection with a software update, such as a first modified database 402 (which may be the first modified database 308 shown in FIG. 3) or a second modified database 404 (which may be the second modified database 312 shown in FIG. 3). The comparison can be performed to determine how the software update resulted in differences between the two versions of the database. In other contexts, however, it can be useful to determine how different software updates result in different changes to a common initial version of a database.

In a PaaS environment, the database 400 can be configured based on an original version of platform software. The platform software can undergo multiple updates, for example, for deploying different versions of the software or for testing the results of the updates for performance. A first software update can be performed to update the database 400 to the first modified database 402 using first instructions, as indicated by an MTMT (e.g., the MTMT 310 shown in FIG. 3). Separately, a second software update can be performed to update the database 400 to the second modified database 404 using second instructions, as indicated by another MTMT (e.g., the MTMT 314 shown in FIG. 3). After the first and second software updates are performed, various comparisons can be made. For example, a comparison can be made between the database 400 and the first modified database 402, between the database 400 and the second modified database 404, or between the first modified database 402 and the second modified database 404.

The comparison between the database 400 and the first modified database 402, or between the database 400 and the second modified database 404, can indicate how the respective software update changed the database 400 using respective sets of update instructions associated therewith. The comparison between the first modified database 402 and the second modified database 404 can further indicate how different software updates compare to one another, for example, to determine which software update is more optimal from a performance or other standpoint.

For example, a vendor of a cloud-based platform (e.g., a PaaS service provider) may perform a first software update to update the platform software, which first software update can also cause the database 400 to be changed into the first modified database 402. In the interest of determining a way to better optimize the software update process, however, the vendor may also perform a second software update to the platform software, which second software update can cause the database 400 to be changed into the second modified database 404. For example, the second software update can include updating the database 400 with second instructions intended to reduce the period of time required for performing the second software update (e.g., as compared to the first software update).

As a result, the vendor can compare the first modified database 402 and the second modified database 404 to determine whether the optimization of the second software update is preferable to the non-optimized first software update. For example, during comparison, if a same database statement run against the first modified database 402 and the second modified database 404 updates fewer records in the second modified database 404 than the first modified database 402, it can be determined (e.g., using data from resulting MTMTs) whether another database statement was run earlier that caused some of the records of second modified database 404 to be ineligible for modification by a later database statement.

Where the first and second modified databases 402, 404 are compared and differences between them identified, comparisons can be made between the database 400 and each of the first and second modified databases 402, 404 to indicate the nature of the differences. For example, by comparing each of the first and second modified databases 402, 404 to the database 400, it can be determined whether an identified difference between the first and second modified databases 402, 404 arose because only one of the first and second modified databases 402, 404 changed from the version of the database 400. This can indicate, for example, that the respective software update that did not result in the database with the changed value may have failed to touch a record as intended. It could also or instead indicate that the respective software update that did result in the database with the changed value may have unintentionally touched the record that resulted in the difference. The database 400 can be modified after performing a first software update and before performing a second software update, for example, by turning on a flag. The first and second modified databases 402, 404 can then be compared to determine how the modification would affect the resulting database.

Figure 5:
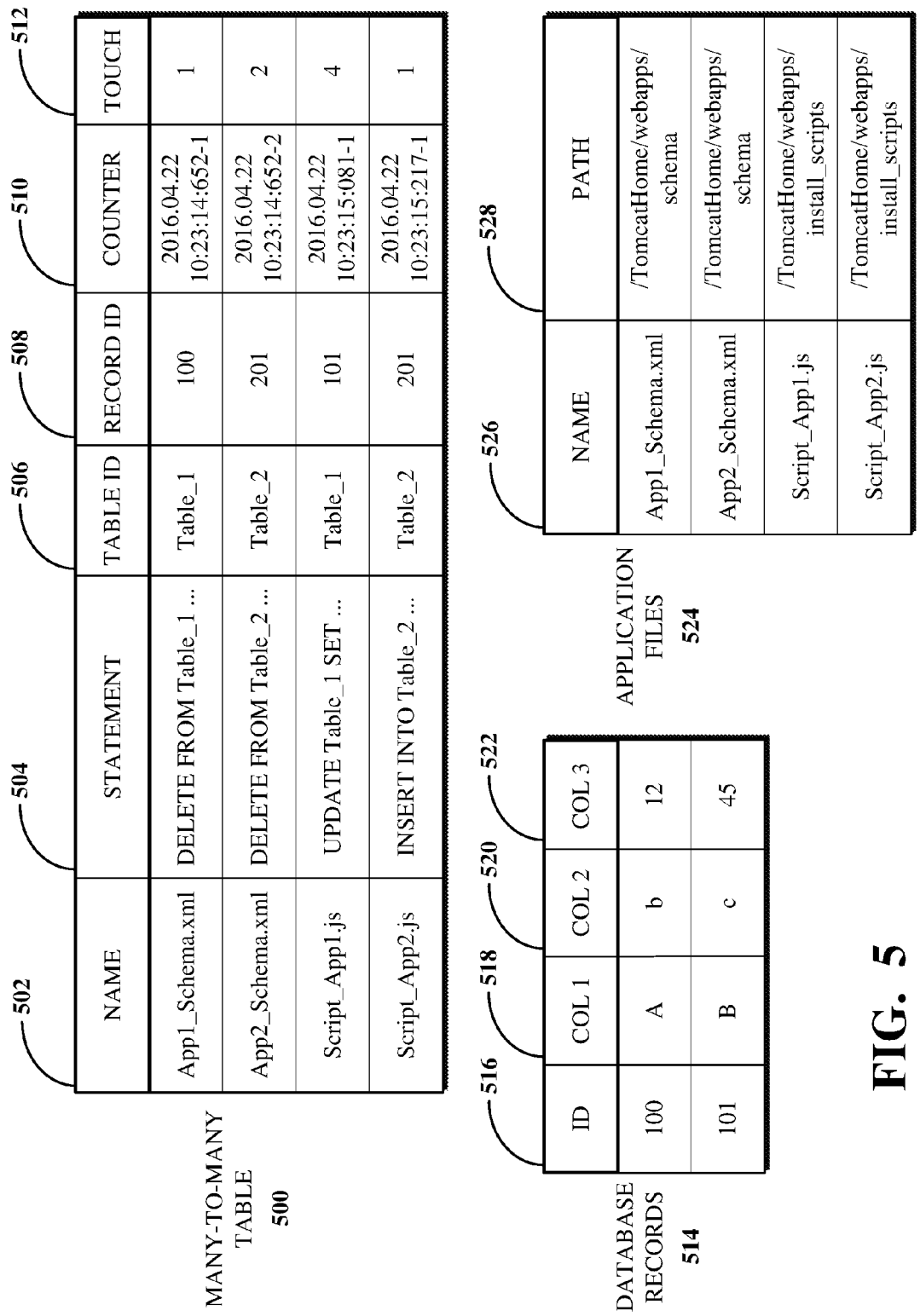
FIG. 5 is an illustration of an example of a many-to-many table generated responsive to a database comparison.

FIG. 5 is an illustration of an example of an MTMT 500 generated responsive to a database comparison. The MTMT 500 can include references to data in tables storing database record data and update instructions associated with a software update (e.g., based on the update instructions 300 processed by the update module 304 as shown in FIG. 3). For example, the MTMT 500 can includes columns for storing the identifier of a database record as a record ID 508 (e.g., within another database table), and the identifier of the table in the database in which the record is stored as a table ID 506.

An example of a database table for storing records is shown at the database records table 514. The database records table 514 includes a column for storing the identifier of a database record as a database record ID 516 (e.g., which can correspond to the column for storing record IDs 508 of the MTMT 500), and one or more columns 518, 520, 522 for storing various data field values. For example, the database records table 514 can represent "Table_1" referenced in the first and third rows of the MTMT 500.

For some operations, such as those performed in bulk processing, the record ID 508 may not be present, in which case the table ID 506, a database statement 504, and a number of records touched 512 by the database statement 504 within the database records table 514 can be recorded, as discussed below. The MTMT 500 can also include columns for storing data fields indicating a name 502 of an application file from which a call for modifying a database record originated. For example, the MTMT 500 can associate modifications performed to the database, the records the modifications touched, and the update instructions that were processed when the modifications occurred.

The MTMT 500 can retrieve a system file path for a specific update instruction from an application files table 524, such as based on a name of the application file that includes that specific update instruction. For example, the application files table 524 can include a column for storing a name 526 that corresponds to the name 502 stored in the MTMT 500 and a column for storing a path 528, such as the system file path associated with the application files names 526. In some implementations, the MTMT 500 can include a column for storing the system file path for application files, in which case the application files table 524 may not be included.

The MTMT 500 can include a data field for recording a timestamp indicative of a time at which a database call was made. The time stamp can resolve down to or beyond a millisecond at which the database call was made. In some implementations, the MTMT 500 can include a data field for a counter 510 indicating an order in which database calls were made. For example, where multiple database calls have timestamps indicating that they were all recorded at the same time, the counter 510 can show the order in which those database calls were made. The counter 510 can increment for all database calls regardless of the timestamp recorded for the calls.

The timestamp and the counter 510 data fields can be indicated in a single column or data field of the MTMT 500. To the extent differences in the operation of two databases are indicated, the ordering of the fields touched by database calls as shown by the timestamp or the counter 510 data fields in the MTMT 500 can be used to indicate a reasoning for the differences. For example, the ordering can help to identify how data was last loaded in order to try to make an update behave similarly or identically to the previous update. In some implementations, the MTMT 500 can be sorted or filtered based on user-selected data fields, such as a timestamp (or the counter 510), a number of record touches 512, the record ID 508 or table ID 506, etc.

As mentioned above, the MTMT 500 can include a touch column for indicating the number of records touched 512 (e.g., a number of times that a particular database record has been touched), or modified, by database statements performed against a database that stores that record. For example, where a record was touched N times, the touch column can reflect that information. The information stored in the touch column can then be used by the user to determine if the first N−1 iterations were necessary.

For example, a user can review a log generated for a software update (e.g., by the blame module 306 shown in FIG. 3) to determine whether changes can be made to the operations associated with the software update to reduce the number of times the particular record is touched. This information can be useful for improving the efficiency of the software update. That is, it may be the case that the software update may have the same end result where only a single operation performs all of the requested changes to a record that was touched by multiple operations.

Implementations of the MTMT 500 can include additional, less, or combined functionality as described above, or functionality other than that described above, or combinations thereof. For example, the MTMT 500 may include a column (not shown) for indicating the number of records that a particular database operation modified. For example, the operation "DELETE from tablename WHERE geo='Europe'" might match different numbers of records in different situations. The number of records modified in different software update processes can be used (e.g., by the diffing module 316 shown in FIG. 3) to identify changes in the impact of those operations.

Figure 6:
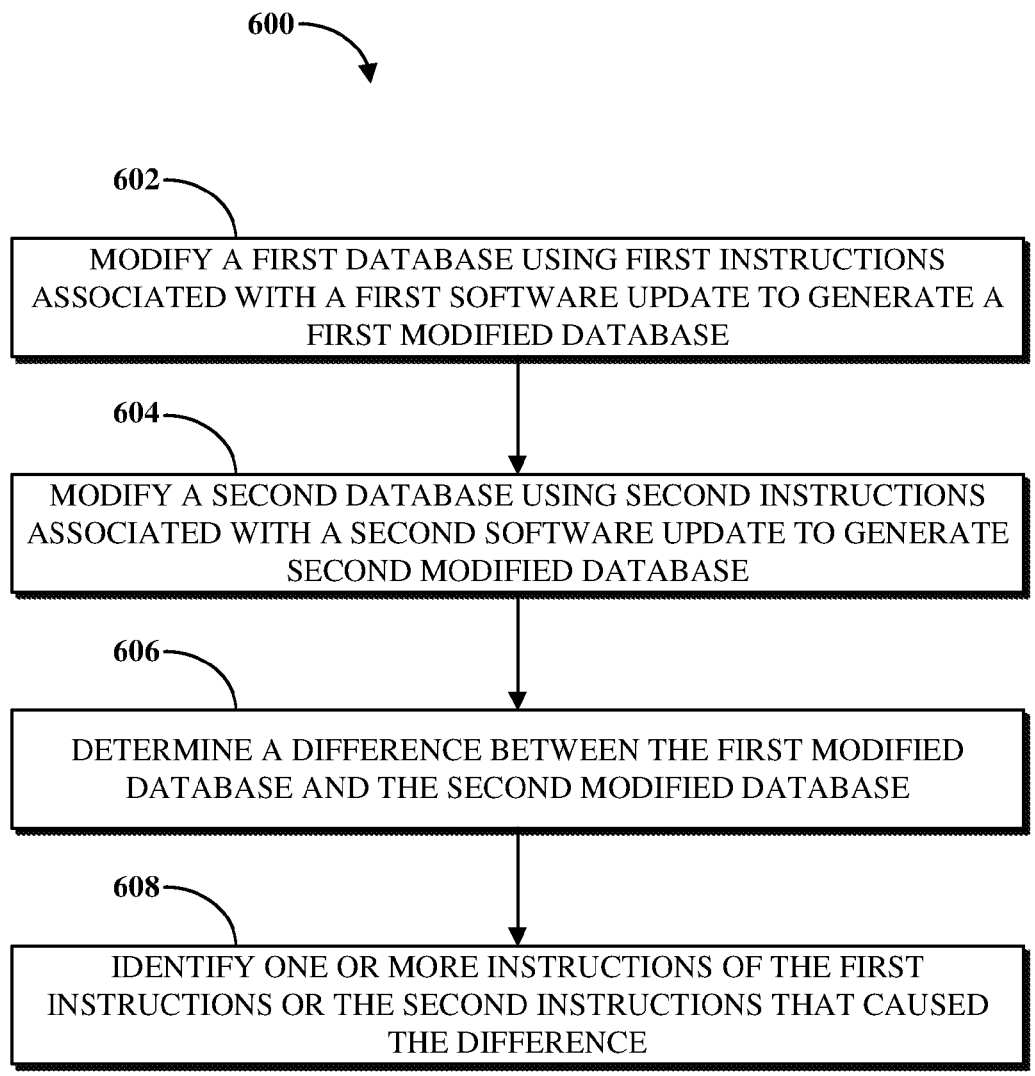
FIG. 6 is a flowchart illustrating an example of a technique for mapping database changes based on software updates.

FIG. 6 is a flowchart illustrating an example of a technique 600 for mapping database changes based on software updates, such as in the system 100 as generally illustrated in FIG. 1. In some implementations, the technique 600 can be executed using computing devices, such as the systems, modules, and devices described with respect to FIGS. 1, 2, and 3. In some implementations, the technique 600 can be performed, for example, by executing a machine-readable program or other computer-executable instructions, such as instructions or programs described according to JavaScript, C, or other such instructions. The steps, or operations, of the technique 600 or any other technique, method, process, or algorithm described in connection with the implementations disclosed herein can be implemented directly in hardware, firmware, software executed by hardware, circuitry, or a combination thereof.

In some implementations, the technique 600 includes modifying a first database using first instructions to generate a first modified database via 602, modifying a second database using second instructions to generate a second modified database via 604, determining a difference between the first and second modified databases via 606, and identifying one or more instructions of the first instructions or the second instructions that caused the difference via 608.

At 602, a first database can be modified using first instructions associated with a first software update to generate a first modified database. At 604, a second database can be modified using second instructions associated with a second software update to generate a second modified database. The first and second databases can be one database that is separately modified using the first instructions and the second instructions. The separate modification of the one database by the first instructions and the second instructions allows the respective instructions to modify the one database from an original state. As such, the original state of the one database is modified using the first instructions at 602, and the original state of the one database is modified using the second instructions at 604. Alternatively, the first and second databases can be identical, such as where the first database and the second database are copies of the same source database. Some of the instructions comprising the first and second sets of instructions may be the same. Alternatively, the first and second sets of instructions may be completely different from one another. The modification of the first database at 602 and the modification of the second database at 604 can be simultaneous or can occur at different times.

A first MTMT is generated based on the first software update and a second MTMT is generated based on the second software update. The respective MTMTs include entries corresponding to portions of the associated databases that were changed by the respective instructions. For example, where the first instructions changed a table of the first database by including an additional column within that table in the first modified database, the first MTMT can include an entry indicative of the additional column. The entry can indicate the portion of the instructions that caused the change (e.g., a specific XML, JavaScript, or like file), the aspect of the database that was changed, and a number of times that that aspect was changed in total by the instructions.

At 606, a difference between the first modified database and the second modified database is determined. The difference can include but is not limited to one or more differences indicative of database records, database field values, or database structural elements that differ between the first and second modified databases. For example, the difference can indicate that the first modified database includes a database structural element not present in the second modified database. In another example, the difference can indicate that, although the first and second modified databases both include a particular database field, the value of the data stored in that field differs between the first and second modified databases.

At 608, one or more instructions of the first instructions or the second instructions can be identified as having caused the difference determined at 606. The one or more instructions can include instructions from only the first instructions, instructions from only the second instructions, or instructions from both the first instructions and the second instructions. The one or more instructions can be identified by referencing entries within the first MTMT or the second MTMT that correspond to the difference determined at 606. For example, the first MTMT can be queried for data associated with the aspect of the first modified database that corresponds to the determined difference. The second MTMT can be queried for data associated with the aspect of the second modified database that corresponds to the determined difference. The results of those queries can refer to entries of the respective MTMTs. The MTMTs can then be queried based on those results to identify the specific instructions that are associated with those entries.

Although the technique 600 is shown as a series of operations for clarity, implementations of the technique 600 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

An implementation includes means for modifying a first database using first instructions associated with a first software update to generate a first modified database; means for modifying a second database using second instructions associated with a second software update to generate a second modified database; means for determining a difference between the first modified database and the second modified database; and means for identifying, based on the difference, one or more instructions of the first instructions or the second instructions that caused the difference. An implementation includes means for generating a second database from a first database based on operations associated with one or more software updates, and means for determining that at least some of the operations are associated with differences between the first database and the second database.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for identifying updates to software that cause changes to databases accessible by the software, the method comprising:
    modifying a database storing data associated with a software application, wherein modifying the database comprises using first instructions associated with a first software update to the software application to generate a first modified database;
    modifying the database using second instructions associated with a second software update to the software application to generate a second modified database;
    generating a many-to-many table, wherein the many-to-many table maps one or more records in the database that were changed based on the first and second instructions, wherein the many-to-many table comprises information associated with respective application files from which the first software update and the second software update originated;
    determining a difference between the first modified database and the second modified database; and
    identifying, based on the difference, one or more instructions of the first instructions or the second instructions that caused the difference.

2. The method of claim 1, wherein modifying the database using instructions associated with a software update to generate a modified database comprises:
    converting the instructions into one or more operations performed against at least one of the software or the database,
    wherein the database is modified responsive to performing at least some of the one or more operations.

3. The method of claim 2,
    wherein entries of the many-to-many table are associated with respective ones of the at least some of the one or more operations.

4. The method of claim 3, wherein a first many-to-many table is generated based on at least one of the one or more operations performed to generate the first modified database and a second many-to-many table is generated based on at least one of the one or more operations performed to generate the second modified database, and wherein identifying the one or more instructions of the first instructions or the second instructions that caused the difference comprises:
    querying the first many-to-many table and the second many-to-many table for entries associated with the difference, wherein the entries associated with the difference indicate an operation that caused the difference, wherein the operation is converted from at least one of the first instructions or the second instructions, and wherein the difference indicates any of a database record, a database field value, and a database structural element that differs between the first modified database and the second modified database.

5. The method of claim 3, the method comprising:
excluding, from the many-to-many table, data associated with ignored tables of the database.

6. The method of claim 1, the method comprising:
determining functional equivalence between a first database record of the first modified database and a second database record of the second modified database, wherein the first database record and the second database record are identical, and wherein database field values stored within the first database record and database field values stored within the second database record are not identical.

7. The method of claim 1, the method comprising:
determining a first count indicative of a first number of database records that differ between the first modified database and the second modified database;

determining a second count indicative of a second number of database field values that differ between the first modified database and the second modified database; and determining a third count indicative of a third number of database records storing database field values that differ between the first modified database and the second modified database, wherein an error is indicated responsive to an inconsistency between the first count, the second count, and the third count.

8. The method of claim 1, wherein the first modified database and the second modified database are identical before being modified.

9. A system for identifying updates to software that cause changes to databases accessible by the software, the system comprising:

a memory configured to store one or more processor-executable routines; and a processor configured to communicate with the memory and to execute the routines stored therein, wherein the routines, when executed, cause the system to:

modify a database storing data associated with a software application, wherein modifying the database comprises using first instructions associated with a first software update to the software application to generate a first modified database;

modify the database using second instructions associated with a second software update to the software application to generate a second modified database;

generate a many-to-many table, wherein the many-to-many table maps one or more records in the database that were changed based on the first and second instructions, wherein the many-to-many table comprises information associated with respective application files from which the first software update and the second software update originated;

determine a difference between the first modified database and the second modified database; and identify, based on the difference, one or more instructions of the first instructions or the second instructions that caused the difference.

10. The system of claim 9, wherein the routines to modify the database using instructions associated with a software update to generate a modified database, when executed, cause the system to:

convert the instructions into one or more operations to be performed against at least one of the software or the database, wherein the database is modified responsive to a performance of at least some of the one or more operations.

11. The system of claim 10,
wherein entries of the many-to-many table are associated with respective ones of the at least some of the one or more operations.

12. The system of claim 11, wherein a first many-to-many table is generated based on at least one of the one or more operations performed to generate the first modified database and a second many-to-many table is generated based on at least one of the one or more operations performed to generate the second modified database, and wherein the routines to identify the one or more instructions of the first instructions or the second instructions that caused the difference, when executed, cause the system to:

query the first many-to-many table and the second many-to-many table for entries associated with the difference, wherein the entries indicate an operation that caused the difference, wherein the operation is converted from at least one of the first instructions or the second instructions, and wherein the difference indicates any of a database record, a database field value, and a database structural element that differs between the first modified database and the second modified database.

13. The system of claim 11, wherein the routines, when executed, cause the system to:
exclude, from the many-to-many table, data associated with ignored tables of the database.

14. The system of claim 9, wherein the routines, when executed, cause the system to:
determine functional equivalence between a first database record of the first modified database and a second database record of the second modified database, wherein the first database record and the second database record are identical, and wherein database field values stored within the first database record and database field values stored within the second database record are not identical.

15. The system of claim 9, wherein the routines, when executed, cause the system to:
determine a first count indicative of a first number of database records that differ between the first modified database and the second modified database;

determine a second count indicative of a second number of database field values that differ between the first modified database and the second modified database; and determine a third count indicative of a third number of database records storing database field values that differ between the first modified database and the second modified database, wherein an error is indicated responsive to an inconsistency between the first count, the second count, and the third count.

16. The system of claim 9, wherein the first modified database and the second modified database are identical before being modified.

17. A method, comprising:
generating a second database from a first database based on instructions associated with one or more software updates to a software application, wherein the one or more software updates modify the first database using the instructions associated with the one or more software updates;

generating a table, wherein the table maps one or more records in the first database that were changed based on the instructions, wherein the table comprises information associated with respective application files from which the one or more software updates update originated;

determining a plurality of differences between the first database and the second database; and determining which respective instruction of the instructions caused the plurality of differences between the first database and the second database.

18. The method of claim 17, wherein generating the second database from the first database based on the instructions associated with the one or more software updates comprises:

modifying the first database using first instructions associated with a first software update of the one or more software updates to generate the second database.

19. The method of claim 18, wherein determining that at least some of the instructions are associated with the plurality of differences between the first database and the second database comprises:

comparing the first database and the second database to determine the plurality of differences; and querying the table for entries associated with the plurality of differences.

20. The method of claim 17, the method comprising:

generating a third database from the first database based on other instructions associated with the one or more software updates, wherein the one or more software updates modify the first database using the other instructions associated with the one or more software updates; and determining which respective instruction of the other instructions caused the plurality of differences between the second database and the third database.

* * * * *